United States Patent
Varaschin de Moraes et al.

(10) Patent No.: US 10,303,269 B2
(45) Date of Patent: May 28, 2019

(54) SCREEN ORIENTATION ADJUSTMENT

(71) Applicant: Hewlett-Packard Development Company, L.P., Houston, TX (US)

(72) Inventors: Juliano Godinho Varaschin de Moraes, Mountain View, CA (US); Nicholas Hallas, Palo Alto, CA (US); Carol Ozaki, Cupertino, CA (US); Syed S. Azam, Tomball, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 73 days.

(21) Appl. No.: 15/307,725

(22) PCT Filed: Apr. 30, 2014

(86) PCT No.: PCT/US2014/036269
§ 371 (c)(1),
(2) Date: Oct. 28, 2016

(87) PCT Pub. No.: WO2015/167564
PCT Pub. Date: Nov. 5, 2015

(65) Prior Publication Data
US 2017/0052605 A1 Feb. 23, 2017

(51) Int. Cl.
*G09G 5/00* (2006.01)
*G06F 3/0346* (2013.01)
(Continued)

(52) U.S. Cl.
CPC .......... *G06F 3/0346* (2013.01); *G06F 1/1694* (2013.01); *G06F 3/0487* (2013.01);
(Continued)

(58) Field of Classification Search
CPC ............... G06F 3/04845; G06F 3/0487; G06F 2200/1614; G06F 2200/1637
See application file for complete search history.

(56) References Cited

U.S. PATENT DOCUMENTS

2007/0121869 A1*  5/2007  Gorti ................. H04L 29/06027
                                                            379/201.02
2008/0059888 A1   3/2008  Dunko
(Continued)

FOREIGN PATENT DOCUMENTS

| KR | 1020090008751 A | 1/2009 |
| TW | 201041363 A | 11/2010 |
| WO | WO-2008090516 A1 | 7/2008 |

OTHER PUBLICATIONS

Harrison, Keth, "Adding a Settings Bundle to an iPhone App," May 18, 2010, pp. 1-4, Available at: <useyourloaf.com/blog/2010/05/18/adding-a-settings-bundle-to-an-iphone-app.html.

*Primary Examiner* — Charles Tseng
(74) *Attorney, Agent, or Firm* — Brooks, Cameron & Huebsch PLLC

(57) ABSTRACT

An example processor-implemented method for adjusting screen orientation of a display associated with a device with the present disclosure is identifying a request for a new profile, the new profile being created in the device, requesting a selection of a screen orientation for the new profile, adjusting the orientation of the display for the new profile based on the screen orientation selection, and manage applications on the device based on the screen orientation selection.

15 Claims, 3 Drawing Sheets

(51) Int. Cl.
  *G06F 3/0484* (2013.01)
  *G06F 3/0487* (2013.01)
  *G06F 1/16* (2006.01)
  *G06F 8/60* (2018.01)
  *G06F 9/445* (2018.01)
  *H04M 1/725* (2006.01)

(52) U.S. Cl.
  CPC ............ *G06F 3/04845* (2013.01); *G06F 8/60* (2013.01); *G06F 9/4451* (2013.01); *H04M 1/72563* (2013.01); *H04M 1/72577* (2013.01); *G06F 2200/1614* (2013.01); *G06F 2200/1637* (2013.01); *G09G 2340/0492* (2013.01); *H04M 2250/12* (2013.01)

(56) References Cited

U.S. PATENT DOCUMENTS

| | | | |
|---|---|---|---|
| 2009/0225026 A1* | 9/2009 | Sheba | G06F 1/1626 345/156 |
| 2011/0246296 A1 | 10/2011 | Howard et al. | |
| 2011/0320405 A1* | 12/2011 | Hsu | G06F 1/1632 707/634 |
| 2012/0062757 A1 | 3/2012 | Schindler | |
| 2012/0206332 A1 | 8/2012 | Yonemoto | |
| 2012/0242701 A1 | 9/2012 | Ingrassia | |
| 2013/0019183 A1 | 1/2013 | Reeves et al. | |
| 2013/0139076 A1 | 5/2013 | Mochizuki et al. | |
| 2013/0155096 A1 | 6/2013 | Legair-Bradley | |
| 2013/0229568 A1* | 9/2013 | Belesiu | G06F 1/1618 348/372 |
| 2014/0078178 A1* | 3/2014 | Li | G09G 5/00 345/659 |
| 2014/0115488 A1* | 4/2014 | Hackborn | H04M 1/72544 715/741 |
| 2014/0149931 A1* | 5/2014 | Miki | G06F 9/451 715/803 |

\* cited by examiner

SCREEN ORIENTATION ADJUSTMENT

CROSS-REFERENCE TO RELATED APPLICATION

This application is a U.S. National Stage Application of and claims priority to International Patent Application No. PCT/US2014/036269, filed on Apr. 30, 2014, and entitled "SCREEN ORIENTATION ADJUSTMENT," which is hereby incorporated by reference in its entirety.

BACKGROUND

Mobile providers have launched hundreds of new smartphones in the last three years based upon several different computing platforms (e.g., Apple iPhone, Android, BlackBerry, Palm, Windows Mobile, and the like). As mobile devices are becoming more ubiquitous, the number of applications that can be used on these mobile devices are increasing significantly. With the recent development and increased popularity of advanced mobile or handheld computing devices (e.g., smartphones, tablets, etc.), many applications and programs are developed specifically for these mobile devices.

Smartphone computing platforms typically include a mobile operating system ("OS") running on a mobile processor. For example, some smartphones run Google's Android operating system. Android runs applications that are specifically developed to run on the Android operating system. Further, these devices are equipped with a diverse set of communication interfaces for the applications.

BRIEF DESCRIPTION OF THE DRAWINGS

Examples are described in the following detailed description and in reference to the drawings, in which.

DETAILED DESCRIPTION

Figure 1:
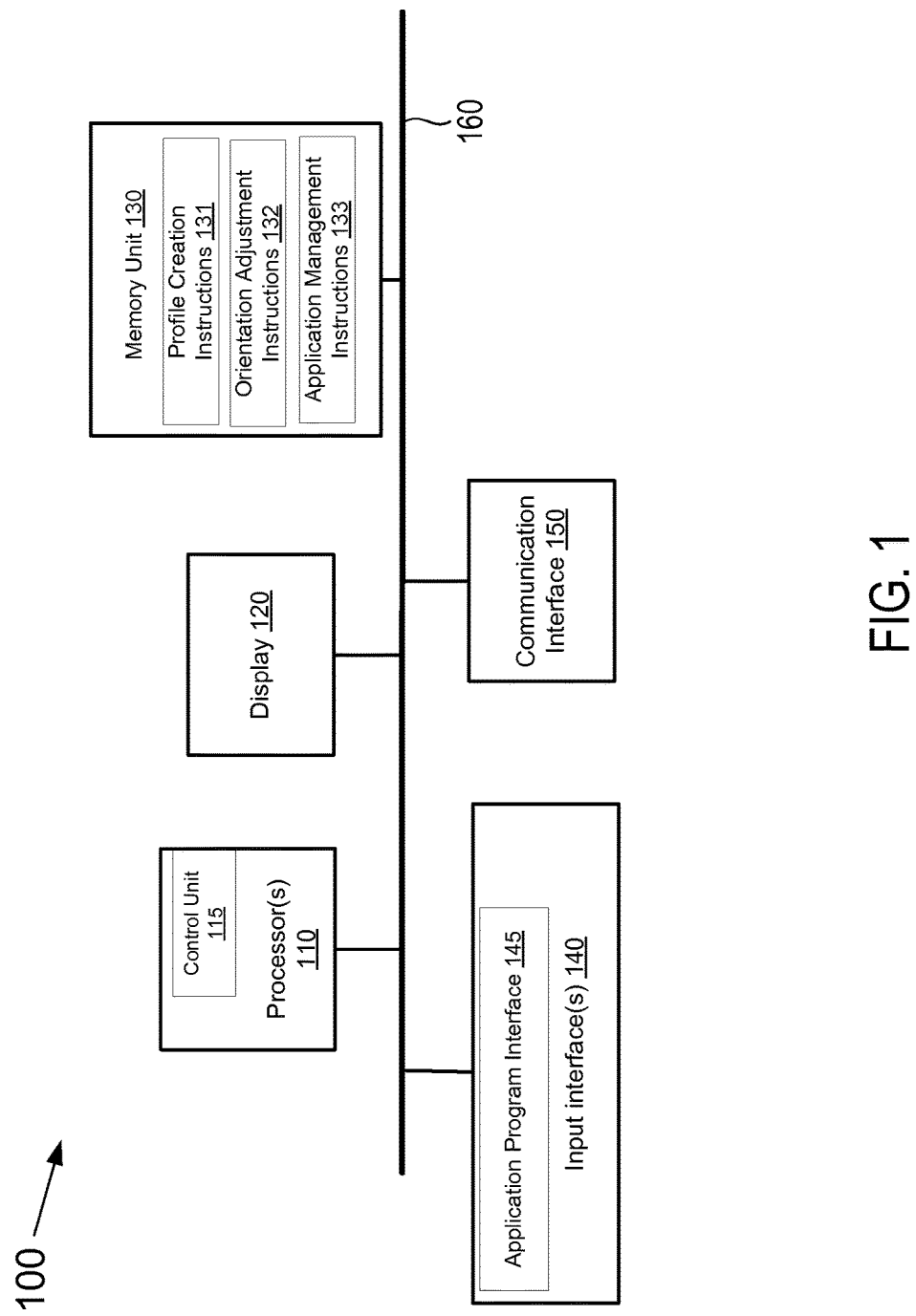
FIG. 1 illustrates a schematic representation of an example computing device in accordance with an implementation of the present disclosure.

Various aspects of the present disclosure are directed to a field of wireless devices. More specifically, and as described in greater detail below, various aspects of the present disclosure are dire to a manner by which mobile applications are presented and displayed on mobile devices.

Unlike stationary computing devices that have a fixed orientation of their display screens (e.g., landscape orientation, portrait orientation, etc.), applications displayed on mobile or handheld computing devices can be viewed in either landscape or portrait mode. Most mobile phones and tablets include hardware components (e.g., accelerometer, gyroscope, etc.) that recognize a request for change in orientation and adjust the screen of the mobile device accordingly. The available screen rotation on mobile devices allows users to view applications and content on these devices in different orientations and aspect ratios.

While a significant number of computer users are moving to handheld computing devices because of their simplicity, mobility, and usability, many other users continue to use stationary computing devices (e.g., desktops, all in one devices, etc.) that offer various advantages over mobile computing devices (e.g., larger screens, greater processing power, etc.). Many stationary computing devices may use mobile operating systems and may run mobile applications. These stationary mobile devices may support one screen orientation (e.g., landscape, portrait) due to the fact that the display screens of the stationary computing devices are larger and they may not rotate. For example, many of the available stationary computing devices support displayed content only in a landscape orientation.

When writing mobile applications, many developers may choose the display orientation of the application. As most smartphones have an elongated vertical display (i.e., a portrait orientation), there are many legacy mobile applications from these smartphones that are only available in a portrait orientation. Further, many mobile application stores implement a filtering mechanism based on the evaluated hardware components or features of the device that is downloading a particular mobile application. These filtering mechanisms may not allow a user to download the application to a device that does not support multiple display orientations.

Aspects of the present disclosure described herein disclose allowing the user to set which orientation the device may be used in and makes all the compatible applications available. Among other things, this approach allows using a stationary mobile device which is not restricted to displaying only the applications compatible with the orientation that the device is preset for.

Moreover, aspects of the present disclosure described herein use the feature of restricted profiles, which basically allows the device administrator to create new profiles and restrict which applications this new profile may be able to execute. The aspects of the present disclosure described herein allow the administrator to define an orientation for the profile while creating the profile. Among other things, this approach may provide the flexibility of downloading and viewing applications without being restricted to a preset manufacturing orientation of the display.

In one example in accordance with the present disclosure, a method for adjusting a screen orientation of a display is provided. The method comprises identifying a request for a new profile, the new profile being created in the device, requesting a selection of a screen orientation for the new profile, adjusting the orientation of the display for the new profile based on the screen orientation selection, and manage applications on the device based on the screen orientation selection.

In another example in accordance with the present disclosure, a system is provided. The system comprises a profile engine to create a profile in a device and request a selection of a screen orientation of a display for the profile, a screen orientation engine to adjust the orientation of the display for the profile based on the selection of the screen orientation, and an application engine to manage applications in the device based on the screen orientation selection.

In a further example in accordance with the present disclosure, a non-transitory computer readable medium is provided. The non-transitory computer-readable medium comprises instructions which, when executed, cause a device to (i) create a new profile associated with a user of the device, (ii) receive a selection of a screen orientation for the new profile, (iii) apply the received selection to the screen orientation to a display of the device, the display being associated with the profile, and (iv) disable applications that require an orientation different from the received selection of the screen orientation.

System 100 in accordance with an implementation. It should be readily apparent that the present illustration should not be interpreted to be limited by this particular illustrative architecture shown in FIG. 1, and the system 100 represents a generalized illustration and that other elements may be added or the illustrated elements may be removed, modified, or rearranged in many ways.

The system 100 may be a convertible computing device, which includes one of various computing devices that have a keyboard/battery portion and a display screen portion. The convertible computing devices may include, but not limited, to any one of various tablets, and other similar portable electronic devices that include a display screen, a processor, and have a screen setting of an orientation (e.g. landscape, portrait). When the display screen portion of these devices is docked and/or mounted, these devices operate as a stationary computing device (e.g., personal computers (i.e., desktops), server computers, laptop computers (with permanently attached display screens), all in one devices, and other similar devices that possess comparable characteristics), and their screens may not rotate. On the other hand, when the display screen portion is not docked, these devices operate as handheld devices and a user may rotate their screens between a different orientations. In another example, the computing device 100 may be a mobile or handheld computing device that does not include hardware components to support screen rotation.

The computing device 100 runs mobile applications, which include one of various software applications that are developed and designed to run on mobile devices, convertible, computers and other computing devices. Mobile applications frequently serve provide users with similar services to those accessed on personal computers and are usually available through application distribution platforms. For example, the mobile applications may include a social media platform such as Twitter, YouTube, Brightcove, Facebook, and Tumblr, as well as instant messaging. The social media platform may encompass services or forums which support electronic social interaction between users, and also provide for sharing of electronic content. For example, electronic content may be in the form of a video posted to a social media service and subsequently viewed and commented on by one or more users of that social media service.

Any computing device described herein may include a processor and memory. The computing device or system 100 includes, but may not be limited to, a processor 110 (e.g., a central processing unit, a microprocessor, a microcontroller, or another suitable programmable device), a display screen 120, a memory unit 130, input interfaces 140, and a communication interface 150. Each of these components or any additional components of the computing device 100 is operatively coupled to a bus 160. The bus 160 may be any of several types of bus structures including a memory bus or memory controller, a peripheral bus, and a local bus using any of a variety of bus architectures. In other examples, the computing device 100 includes additional, fewer, or different components for carrying out similar functionality described herein.

The processor 110 includes a control unit 112 and may be implemented using any suitable type of processing system where at least one processor executes computer-readable instructions stored in the memory 130. The processor 210 may be, for example, a central processing unit (CPU), a semiconductor-based microprocessor, an application specific integrated circuit (ASIC), a field-programmable gate array (FPGA) configured to retrieve and execute instructions, other electronic circuitry suitable for the retrieval and execution instructions stored on a computer readable storage medium (e.g., the memory 130), or a combination thereof. The machine readable medium 130 may be a non-transitory computer-readable medium that stores machine readable instructions, codes, data, and/or other information. The instructions, when executed by processor 110 (e.g., via one processing element or multiple processing elements of the processor) can cause processor 110 to perform processes described herein.

Further, the computer readable medium 130 may participate in providing instructions to the processor 110 for execution. The machine readable medium 130 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. As discussed in more detail above, the processor 110 may be in data communication with the machine readable medium 130, which may include a combination of temporary and/or permanent storage. The machine readable medium 130 may include program memory that includes all programs and software such as an operating system, user detection software component, and any other application software programs. The machine readable medium 130 may also include data memory that may include multicast group information, various table settings, and any other data required by any element of the ASIC.

The processor 110 includes a control unit 115 and may be implemented using any suitable type of processing system where at least one processor executes computer-readable instructions stored in the memory 130. Such instructions include profile creation instructions 131, orientation adjustment instructions 132 and application management instructions 133.

The profile creation instructions 132 comprise instructions for creating multiple profiles in the computing device 100. In one implementation, the computing device 100 may be a device that runs Android as its operating system, and its user can create restricted profiles. When the user creates a restricted profile, he can enable restrictions such as which applications may be available to the user associated with the new profile.

In one implementation, the orientation adjustment instructions may comprise instructions to provide a specific screen orientation (e.g., portrait or landscape) setting for the profile being created. For example, the user may choose portrait, which is then associated with the profile being created. As a result, the display is set to the selected orientation for that profile. When that profile is active on the computing device 100, the screen orientation may be set to portrait. The application management instructions 136 may apply the settings and enable applications that are on the created profiled dynamically based on the selected screen orientation under the created profile. In this example, the applications that require landscape may be disabled, and applications that require portrait may be enabled.

In one implementation, the user may be given the option of creating a standard user account or a restricted profile. When the user selects the restricted profile, the user may be prompted to enter a PIN, password or pattern lock. Depending on the implementation, security features/tools may be implemented in various ways such as by a firewall, one time passwords, encryption programs, digital certificates, user application security, etc. to access the computing device 100. For example, the security features may require a user to log in before allowing a user to access any of the mobile applications installed on the computing device 100.

In one implementation, after the security setting is done, the user may be requested to set the orientation of the screen. For example, the user may choose to set the screen to a landscape orientation. In such implementation, the user may be provided a list of applications available on the computing device 100 and that are compatible to run in the landscape orientation. In another implementation, the user may choose to set the screen to a portrait orientation. In such implementation, the user may be provided a list of applications available on the computing device 100 and that are compatible to run in the portrait orientation. Further, the user may choose a set of applications from the enabled applications that the restricted profile can access.

The communication interface 150 enables the computing device 100 to communicate with a plurality of networks and communication links. In some examples, the communication interface of the computing device 100 may include a Wi-Fi® interface, a Bluetooth interface, a 3G interface, a 4G interface, a near filed communication (NFC) interface, and/or any other suitable interface that allows the computing device to communicate via one or more networks. The networks may include any suitable type or configuration of network to allow the computing device 100 to communicate with any external systems or devices.

The input interfaces 140 can process information from the various external system, devices, and networks that are in communication with the computing device 100. For example, the input interfaces 140 include an application program interface 145. In other examples, the input interfaces 140 can include additional interfaces. The application program interface 145 receives content or data (e.g., video, images, data packets, graphics, etc.) associated with at least one mobile application that runs on the computing device 100.

The display 120 may be a transparent liquid crystal display (LCD), an organic light emitting diode (OLED) display, a plasma display, or any other suitable display. The display 120 may be part of the computing device 100 (e.g., when the computing device 100 is all in one device), may be a separated component that is in electronic communication with the computing device 100, and may be a detachable component that may also be used as a handheld device. The display 120 is to display content from one or more applications running on the computing device 100 on a window shown on the display screen. In one implementation, the display 120 comprises various display properties such as resolution, display pixel density, display orientation and/or display aspect ratio. The display 120 may be of different sizes and may support various types of display resolution, where display resolution is the number of distinct pixels in each dimension that can be displayed on the display 120. For example, the display 120 may support display resolutions of 640×480, 800×600, 1024×768, 1920×1080, or any other suitable display resolutions. When the display screen supports a 1920×1080 display resolution, 1920 is the total number of pixels across the height of the display 120 and 1080 is the total number of pixels across the height of the display 120. Moreover, the display properties may also include input device properties such as touch-screen type, navigation method (e.g., touch-screen, trackball, scroll-wheel, etc.), keyboard availability, and the like.

In one implementation, the orientation of the screen in the computing device 100 is determined from a variety of sources including device characteristics, device indicators, and/or application presentation. For example, when the computing device is first built, it contains one profile (e.g., one active device configuration), and the screen orientation may be set to landscape based on various parameters of the device. The screen configuration may include display properties such as resolution, display pixel density, display orientation and/or display aspect ratio.

Figure 2:
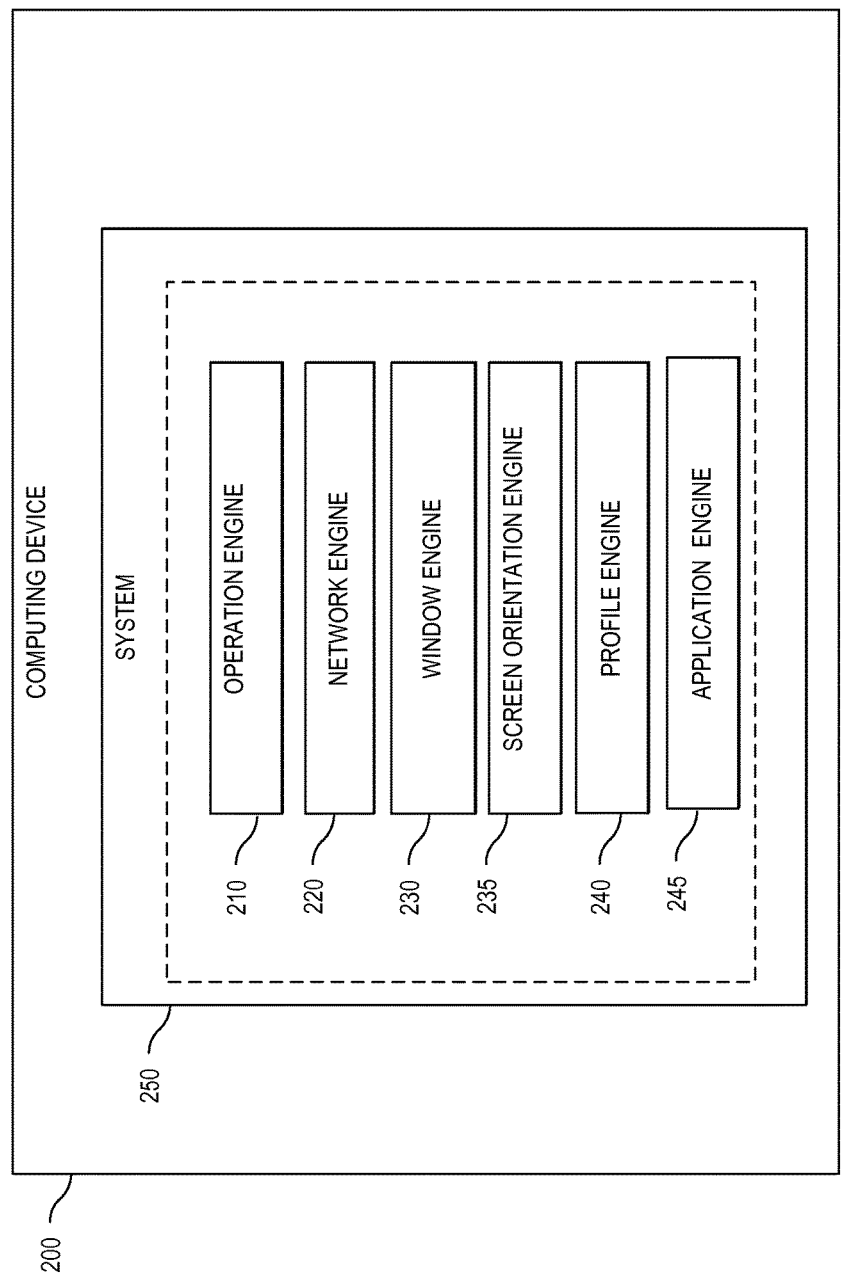
FIG. 2 illustrates an example system for adjusting a screen orientation in accordance with an implementation.

FIG. 2 illustrates an example of a computing device 200 to implement a screen orientation adjustment via the system 250. The system 250 illustrated in FIG. 2 includes various engines to implement the functionalities described herein. The system 200 may include at least an operation engine 210, a network engine 220, window engine 230, screen orientation engine 235, profile engine 240 and an application engine 245. Although the various engines 210-245 are shown as separate engines in FIG. 2, in other implementations, the functionality of all or a subset of the engines 210-245 may be implemented as a single engine. In some examples, the screen adjustment implemented by the system 250 may perform any combination of the functionalities described above in FIG. 1.

Each of the engines of system 200 may be any suitable combination of hardware and programming to implement the functionalities of the respective engine. Such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement system 200. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices. In other examples, the functionalities of any of the engines may be implemented in the form of electronic circuitry.

The operation engine 210 handles an operating system, such as iOS®, Windows®, Android, and any other suitable operating system. The operating system can be multi-user, multiprocessing, multitasking, multithreading, and real-time. In one implementation, the operating system is stored in a memory (e.g., the memory 130 as shown in FIG. 1) performs various tasks related to the use and operation of the computing device 200. Such task may include installation and coordination of the various hardware components of the computer system 200, creation and management of files, operations relating to a graphical user interface in the display, recognizing input from input devices, such as a keyboard, a keypad, or a mouse, sending output to a projector and a camera, keeping track of files and directories on memory (e.g., the memory 130 as shown in FIG. 1), controlling peripheral devices, such as printers, image capture device; and managing traffic on bus (e.g., as shown in FIG. 1).

The network engine 220 includes various components for establishing and maintaining network connections, such as computer-readable instructions for implementing communication protocols including TCP/IP, HTTP, Ethernet®, USB®, and FireWire®.

Further, the system may include various components, such as a window engine 230. In one example, the window engine 230 may be a subset of the operation engine 210 that assists with the creation and management of windows displayed on the display (e.g., the display 120 as shown in FIG. 1) when a user launches a new application.

The profile engine 240 creates a new profile for the user and requests that the user provides a screen orientation selection or setting to be implemented as a part of the new profile. When the profile engine 240 updates the orientation setting of the display based on the input from the user as to the preference of the screen orientation, the screen orientation 235 intercepts a request to apply the new screen orientation setting. In such situation, if the factory setting of the display is different from the requested display orientation, then the screen orientation 235 applies a change of the orientation of the display from a first orientation (e.g., landscape) to a second orientation (e.g., portrait). Further, the screen orientation 235 is used to adjust the resolution of the display 120 to emulate rotation of the screen to the desired new orientation while the screen 25 remains in its original orientation. That way, existing legacy applications that were originally developed only for handheld devices may run on stationary and convertible computing devices. In one example, the screen orientation 235 may be a subset of the window engine 230.

The application engine 245 manages applications based on a selected screen orientation associated with a user profile. Many existing mobile applications may only support one display orientation. In most situations, these mobile applications are only available in a portrait orientation because they were developed for handheld devices with elongated vertical displays. For example, many mobile applications may be developed to require the content or image associated with the application to be displayed at a specific aspect ratio—4:3 (1.33:1) aspect ratio, 16:9 (1.77:1) aspect ratio, or other popular aspect ratio. In addition, filtering mechanisms in different mobile application stores may not allow users to download mobile applications to stationary computing devices that do not support multiple display orientations. Therefore, a large number of existing mobile applications may not be available to stationary or convertible computing devices. The application engine 245 determines what applications to enable and disable based on the selected screen orientation that the applications are to be displayed. For example, if the selected screen orientation is portrait, the application engine 245 enables all the applications that require portrait on the computing device 200. In another example, if the selected screen orientation is landscape, the application engine 245 enables all the applications that require landscape.

Figure 3:
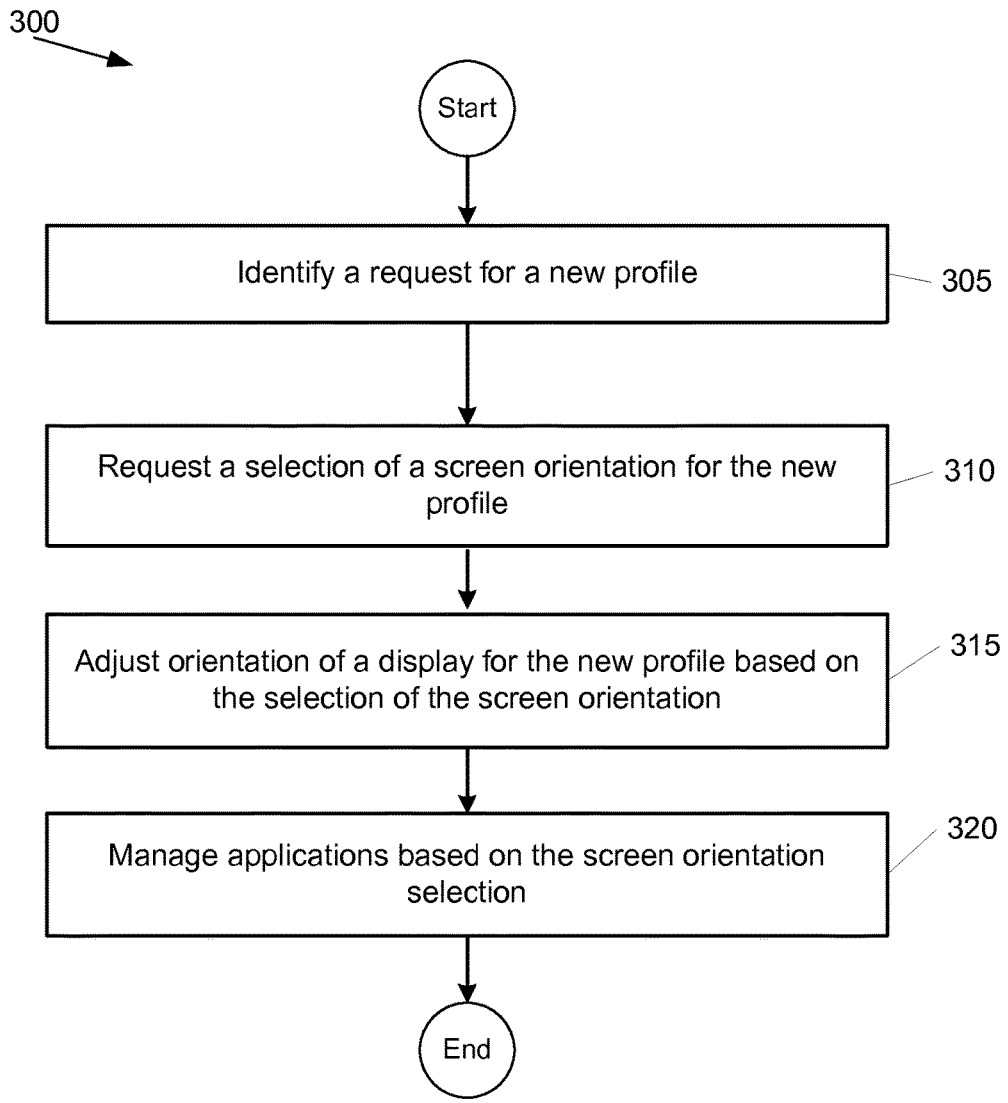
FIG. 3 illustrates an example process flow diagram in accordance with an implementation.

Turning now to the operation of the system 100, FIG. 3 depicts a process flow diagram 300 in accordance with an example implementation. It should be readily apparent that the processes depicted in FIG. 3 represent generalized illustrations, and that other processes may be added or the illustrated processes may be removed, modified, or rearranged in many ways. Further, it should be understood that the processes may represent executable instructions stored on memory that may cause a processing device to respond, to perform actions, to change states, and/or to make decisions, for instance. Thus, the described processes may be implemented as executable instructions and/or operations provided by a memory associated with the computing device 100.

The illustrated process 300 begins at block 305, where the control unit identifies or intercepts a request for a creation of a new profile in the computing device (e.g., the computing device 100 as shown in FIG. 1). In the implementation described in relation to FIGS. 1 and 2, the computing device may be a convertible device and may be docked or mounted. As noted earlier, applications and programs that are displayed on most mobile or handheld computing devices can be viewed in different orientations (e.g., landscape, portrait, etc.) by simply rotating the handheld device and its screen. On the other hand, docked convertible devices may not be able to rotate their screens. Many times the screens of these devices are too large, the devices/screens are placed in a permanent position, and, therefore, screen rotation is not even an option. Further, such devices may not even include the hardware components (e.g., accelerometers, sensors, etc.) to support change in the orientation of the windows displayed on their screens.

At block 310, the system requests that a screen orientation is selected. In one implementation, a user interface is displayed on the display (e.g., the display 120 as shown in FIG. 1), through which a user may enter or select one type of screen orientation. In the described implementation, the screen orientation may be a landscape orientation or a portrait orientation. Moreover, this step further includes associating the selected screen orientation with the created profile.

At block 315, the system applies the selected screen orientation and adjusts the orientation of the display for the created profile. In an alternative implementation, additional screen settings may be adjusted. For example, the system may adjust the resolution of the display so that the mobile application is displayed on the display by using the selected resolution.

At block 320, the system manages applications on the device based on the screen orientation selection. In particular, this process includes disabling applications that require a screen orientation different from the selected screen orientation for the created profile. For example, if the selected orientation is portrait, the applications that require a landscape orientation may be disabled and may not be available to the user of the created profile. Thus, the user of the computing device under the created profile may not be able to download or use some existing mobile applications that require switching the display screen to a different orientation (e.g., landscape). In some implementation, this process also involves enabling the applications that require the selected screen orientation. Further, in other implementations, the system allows the user to identify applications from the list of enabled applications. These identified applications are associated with the user profile, which can be a restricted profile. Restricted profile may mean that the user is limited to the applications that are selected to be run under that profile.

In one implementation, the mobile application may be previously installed on the computing device and is currently being opened by the user. Alternatively, the mobile application may be currently downloaded by the user. In any event, the mobile application may require that the display displays a window in a specific orientation that is different from the current orientation of the screen. The computing device 100 may run at least one application or multiple applications simultaneously.

While the above disclosure has been shown and described with reference to the foregoing examples, it should be understood that other forms, details, and implementations may be made without departing from the spirit and scope of the disclosure that is defined in the following claims.

What is claimed is:

1. A processor-implemented method for adjusting an orientation of a display associated with a device, comprising:
identifying a request for a new profile, the new profile being created in the device;
requesting a selection of a screen orientation for the new profile;
adjusting the orientation of the display for the new profile based on the screen orientation selection;
managing applications on the device based on the screen orientation selection, wherein managing the applications on the device further comprises:
enabling particular applications that require an orientation that is same as the screen orientation selection; and
disabling particular applications that require an orientation that is different than the screen orientation selection, wherein the disabling is performed via a filtering mechanism disabling downloading of the particular applications that require the orientation that is different than the screen orientation selection.

2. The method of claim 1, wherein enabling the particular applications that require the orientation that is same as the screen orientation selection are on a created profile dynamically based on the screen orientation selection under the created profile.

3. The method of claim 1, wherein requesting the selection of the screen orientation for the new profile further comprises displaying a user interface on the display for a user of the device to provide the selection of the screen orientation.

4. The method of claim 1, further comprising allowing a user of the device to determine a list of applications from the applications on the device that are made available to the new profile.

5. The method of claim 1, further comprising creating the new profile based on the request received from a user of the device.

6. The method of claim 1, wherein the new profile is a restricted profile, the restricted profile limiting the applications on the device that can be accessed by a user associated with the new profile.

7. The method of claim 1, further comprising enabling a user to identify those applications associated with the new profile from a list of enabled applications, wherein the new profile includes a restricted profile.

8. The method of claim 7, wherein the new profile limits those applications associated with the new profile to run under the restricted profile.

9. A system, comprising:
a processor;
a memory resource coupled to the processor, wherein the memory resource stores instructions executable by the processor to:
create a profile in a device and request a selection of a screen orientation of a display for the profile;
adjust an orientation of the display for the profile based on the selection of the screen orientation; and
manage applications in the device based on the screen orientation selection, wherein managing the applications on the device further comprises:
enabling particular applications that require an orientation that is same as the screen orientation selection; and
disabling particular applications that require an orientation that is different than the screen orientation selection, wherein the disabling is performed via a filtering mechanism disabling downloading of the particular applications that require the orientation that is different than the screen orientation selection.

10. The system of claim 9, further comprising a convertible computing device, functioning as a stationary device and running on a mobile operating system.

11. The system of claim 9, wherein managing the applications on the device comprises enabling a user to identify those applications on the device associated with a new profile from a list of enabled applications, wherein the new profile includes a restricted profile.

12. A non-transitory computer-readable medium comprising instructions which, when executed, cause a device to:
create a new profile associated with a user of the device;
receive a selection of a screen orientation for the new profile;
apply the received selection of the screen orientation to a display of the device, the display being associated with the new profile;
enable particular applications that require an orientation that is same as the screen orientation selection; and
disable particular applications that require an orientation that is different than the screen orientation selection, wherein the disabling is performed via a filtering mechanism disabling downloading of the particular applications that require the orientation that is different than the screen orientation selection.

13. The non-transitory computer-readable medium of claim 12, further comprising instructions which cause the device to allow the user to switch from the new profile to an old profile, wherein the screen orientation for the new profile is different from a screen orientation of the old profile.

14. The non-transitory computer-readable medium of claim 13, further comprising instructions which cause the device to switch to the screen orientation of the old profile when the user switches from the new profile to the old profile.

15. The non-transitory computer-readable medium of claim 12, further comprising instructions which cause the device to enable the user to identify those applications on the device associated with the new profile from a list of enabled applications, wherein the new profile includes a restricted profile.

* * * * *